(12) United States Patent
Cervantes

(10) Patent No.: US 9,488,833 B2
(45) Date of Patent: Nov. 8, 2016

(54) INTELLIGENT GLASSES FOR THE VISUALLY IMPAIRED

(71) Applicant: International Business Machines Corporation, Armonk, NY (US)

(72) Inventor: Humberto Orozco Cervantes, Tonala (MX)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 14/175,732

(22) Filed: Feb. 7, 2014

(65) Prior Publication Data

US 2015/0227778 A1   Aug. 13, 2015

(51) Int. Cl.
*H04N 13/02* (2006.01)
*G02B 27/01* (2006.01)
*G09B 21/00* (2006.01)

(52) U.S. Cl.
CPC ......... *G02B 27/0101* (2013.01); *G09B 21/003* (2013.01); *H04N 13/0239* (2013.01); *G02B 2027/0138* (2013.01); *G02B 2027/0178* (2013.01)

(58) Field of Classification Search
CPC .............. G06K 9/00201; H04N 13/0239; G09B 21/003; G09B 21/008
USPC ........................................................ 348/47
See application file for complete search history.

(56) References Cited

U.S. PATENT DOCUMENTS

| | | | | |
|---|---|---|---|---|
| 6,084,556 A * | 7/2000 | Zwern | G09B 21/008 345/158 |
| 6,091,546 A * | 7/2000 | Spitzer | G02B 27/017 345/8 |
| 6,184,847 B1 * | 2/2001 | Fateh | G06F 3/011 345/8 |
| 6,198,395 B1 * | 3/2001 | Sussman | A61F 9/08 340/407.1 |
| 6,392,540 B1 * | 5/2002 | Brown | G08B 1/08 340/407.1 |
| 7,004,582 B2 * | 2/2006 | Jannard | G02C 11/06 351/158 |
| 7,150,526 B2 * | 12/2006 | Jannard | G02B 27/0176 351/158 |
| 7,227,893 B1 * | 6/2007 | Srinivasa | G06K 9/00771 348/155 |
| 7,315,241 B1 * | 1/2008 | Daily | G02B 27/01 340/332 |

(Continued)

FOREIGN PATENT DOCUMENTS

EP   2371339 A1   10/2011

OTHER PUBLICATIONS

Ali, M.H. et al., "Advance Video Analysis System and its Applications", European Journal of Scientific Research, ISSN 1450-216X vol. 41 No. 1 (2010), pp. 72-83, © EuroJournals Publishing, Inc. 2010, <http://www.eurojournals.com/ejsr_41_1_08.pdf>.

(Continued)

*Primary Examiner* — Tung Vo
(74) *Attorney, Agent, or Firm* — Maeve Carpenter

(57) ABSTRACT

An embodiment of the present invention is a method for communicating navigation information on a physical environment to a user. The method comprises receiving, by one or more computer processors, at least one digital image of a physical environment of a user that is captured by one or more digital video devices and converting the at least one digital image into a three-dimensional image. Furthermore, the method includes analyzing the three-dimensional image using object analysis to generate output data where the output data corresponds to the physical environment. Additionally, the method includes determining a device associated with the user and formatting the output data for use with the device.

19 Claims, 4 Drawing Sheets

(56) References Cited

U.S. PATENT DOCUMENTS

Figure 1:
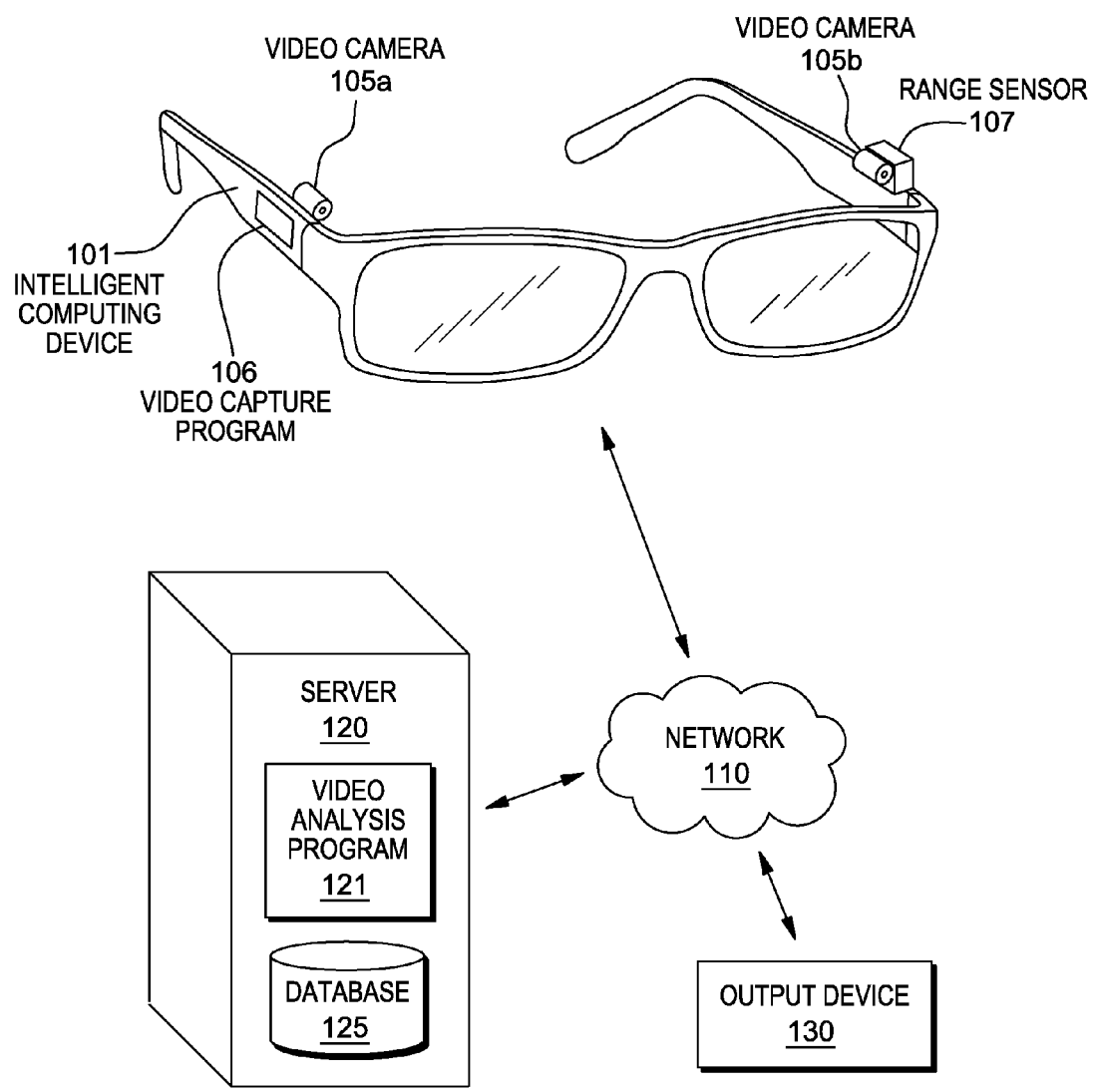

| | | | | |
|---|---|---|---|---|
| 7,461,936 | B2* | 12/2008 | Jannard | G02C 3/003 351/158 |
| 7,561,730 | B2 | 7/2009 | Hewitson et al. | |
| 7,598,976 | B2* | 10/2009 | Sofer | G09B 21/006 348/62 |
| 8,744,125 | B2* | 6/2014 | Zhu | G06K 9/68 382/103 |
| 8,787,970 | B2* | 7/2014 | Warren | 351/158 |
| 8,876,285 | B2* | 11/2014 | Jannard | A61B 5/1112 351/158 |
| 9,155,675 | B2* | 10/2015 | Ye | A61H 3/061 |
| 2003/0063776 | A1* | 4/2003 | Sato | A61F 9/08 382/106 |
| 2004/0249848 | A1* | 12/2004 | Carlbom | G06F 17/30017 |
| 2007/0071285 | A1* | 3/2007 | Kontsevich | G06K 9/6211 382/103 |
| 2008/0198222 | A1* | 8/2008 | Gowda | A61H 3/061 348/62 |
| 2010/0040296 | A1* | 2/2010 | Ma | G06K 9/6249 382/225 |
| 2010/0049431 | A1 | 2/2010 | Zetune | |
| 2011/0081043 | A1* | 4/2011 | Sabol | G06T 7/2053 382/103 |
| 2011/0092249 | A1 | 4/2011 | Evanitsky | |
| 2013/0198197 | A1* | 8/2013 | Sawhney | G06F 17/3087 707/741 |
| 2013/0278631 | A1 | 10/2013 | Border et al. | |
| 2014/0210970 | A1* | 7/2014 | Dalal | A61F 9/08 348/62 |
| 2014/0211988 | A1* | 7/2014 | Fan | G06K 9/3241 382/103 |
| 2014/0300859 | A1* | 10/2014 | Oz | G02B 27/225 351/201 |
| 2014/0333775 | A1* | 11/2014 | Naikal | H04N 7/181 348/159 |
| 2015/0016798 | A1* | 1/2015 | Fujimatsu | G06K 9/00362 386/223 |
| 2015/0125831 | A1* | 5/2015 | Chandrashekhar Nair | G09B 21/004 434/114 |
| 2016/0092736 | A1* | 3/2016 | Mai | G06K 9/00624 382/103 |

OTHER PUBLICATIONS

Bourbakis, Nikolaos G., "Keynote lecture II: Tyflos: a wearable system-prototype for assisting visually impaired", Proceeding ICC'08 Proceedings of the 12th WSEAS International conference on Circuits, World Scientific and Engineering Academy and Society (WSEAS), Stevens Point, Wisconsin, © 2008, ISBN: 978-960-6766-82-4, <http://dl.acm.org/citation.cfm?id=1576433>.

Dakopoulos, D., "A 2D Vibration Array as an Assistive Device for Visually Impaired", Bioinformatics and Bioengineering, 2007, Proceedings of the 7th IEEE International Conference, pp. 930-937, Oct. 14-17, 2007, <http://ieeexplore.ieee.org/xpl/login.jsp?tp=&arnumber=4375670&url=http%3A%2F%2Fieeexplore.ieee.org%2Fxpls%2Fabs_all.jsp%3Farnumber%3D4375670>.

Davis, Roy B. III, "A Gait Analysis Data Collection and Reduction Technique", Human Movement Science 10, pp. 575-587, (1991).

Jose, Joao, et al., "The Smart Vision Local Navigation Aid for Blind and Visually Impaired Persons", International Journal of Digital Content Technology and its Applications, vol. 5, No. 5, pp. 362-375, May 2011.

Knapp, Alex, "This Suit Gives You a Real Life Spider-Sense", Forbes, http://www.forbes.com/sites/alexknapp/2013/02/23/prototype-suit-gives-you-real-life-spider-sense/, Feb. 23, 2013.

Park, Sangho et al., "Multi-perspective Video Analysis of Persons and Vehicles for Enhanced Situational Awareness", IEEE International Conference on Information and Security Informatics, pp. 441-451, May 2006. <http://citeseerx.ist.psu.edu/viewdoc/summary?doi=10.1.1.65.7273>.

"New advances in video-based gait analysis and applications: challenges and solutions", IEEE Transactions on Systems, Man, and Cybernetics—Part B: Cybernetics, 2010. <http://www.ieeesmc.org/publications/TSMCB-SI-CFP.pdf>.

"Smart Glasses Help Blind Navigate", Paxalles, Jul. 28, 2008, < http://paxalles.blogs.com/paxalles/2008107/smart-glasses-h.html.

"Top 5 Japanese Inventions", NTDTV, May 24, 2009, <http://www.youtube.com/watch?v=wK7vvKKAADY&feature=related>.

* cited by examiner

INTELLIGENT GLASSES FOR THE VISUALLY IMPAIRED

FIELD OF THE INVENTION

The present invention relates generally to a method to assist visually impaired people with navigation, and more particularly to analyzing and communicating digital image data of a physical environment to a visually impaired user.

BACKGROUND OF THE INVENTION

For visually impaired people, the world can be a challenging place, including challenges associated with going to dinner or a park in an unfamiliar town such as immediate challenges of curbs, doors, trees, and more importantly, risks due to moving people and cars. A number of solutions introduced over the years aide the visually impaired in safely navigating their environment. Tapping walking sticks are used to avoid immediate obstacles in the path of the visually impaired such as doors, trees, and locating curbs. Seeing eye dogs provide "eyes" and sight to avoid obstacles and risks such as moving vehicles and people.

The development of cell phones with GPS and audible communication of directions has helped the visually impaired with the location of specific buildings or other identified geographic locations. The availability of real-time verbal directions from GPS devices such as "turn left in 100 feet" or even better, "you have reached your destination" has improved the ability of the visually impaired to navigate in new and unfamiliar territory.

SUMMARY

Embodiments of the present invention disclose a method, computer program product, and computer system for communicating navigation information on a physical environment to a user. The method comprises receiving, by one or more computer processors, at least one digital image of a physical environment of a user captured by one or more digital video devices and converting the at least one digital image into a three-dimensional image. Furthermore, one or more computer processors analyze the three-dimensional image using object analysis to generate output data, wherein the output data corresponds to the physical environment. Additionally, one or more computer processors determine a device for output data associated with the user and format the output data for use with the device.

BRIEF DESCRIPTION OF THE SEVERAL DRAWINGS

FIG. 1 is a functional block diagram illustrating a data processing environment, in accordance with an embodiment of the present invention.

FIG. 2 is a flowchart depicting operational steps of a video analysis program for use with an intelligent computing device to assist a visually impaired user in navigation of a physical environment, in accordance with an embodiment of the present invention.

FIG. 3A depicts an exemplary image captured by a video camera for use with the video analysis program of FIG. 2, in accordance with an embodiment of the present invention.

FIG. 3B illustrates an example of an electrical stimulation pattern generated in connection with operation of the video analysis program of FIG. 2, in accordance with an embodiment of the present invention.

FIG. 3C depicts a user wearing the electrical stimulation pad of FIG. 3B, in accordance with an embodiment of the present invention.

FIG. 4 is a block diagram depicting components of a data processing system, such as the intelligent computing device of FIG. 1, in accordance with an embodiment of the present invention.

DETAILED DESCRIPTION

Navigation of unfamiliar territory is challenging for those of us who cannot see or who are visually impaired. Immediate obstacles, variations in terrain, moving vehicles, people or animals, street signs, fences, and trees are all unknown to the visually impaired. Without aide, the ability to safely navigate new or unfamiliar environments is almost impossible. Embodiments of the present invention recognize the visually impaired can use solutions involving integration of advances in technology to improve the quality of their lives and assist them in safely and independently navigating new or unfamiliar environments.

Embodiments of the present invention provide improved ability for the visually impaired to better navigate their physical environment utilizing advances in the analysis of digital images, including static digital images, digital video images, and digital three-dimensional images. Embodiments of the present invention propose a method to capture digital image information of the user's physical environment, analyze the digital information, and effectively communicate resulting output of the analysis to the user.

The present invention will now be described in detail with reference to Figures. FIG. 1 illustrates an exemplary data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Data processing environment 100 includes intelligent computing device 101, server computer 120, and device 130, all interconnected over network 110, in accordance with an exemplary embodiment of the present invention.

Network 110 can be, for example, a local area network (LAN), a wide area network (WAN), a virtual local area network (VLAN) such as the Internet, or a combination of these, and can include wired, wireless, or fiber optic connections. In general, network 110 can be any combination of connections and protocols that will support communications between intelligent computing device 101, server computer 120, and device 130.

In the exemplary embodiment, intelligent computing device 101, depicted as glasses to be worn by a user, includes video camera 105*a* and 105*b*, video capture program 106, and range sensor 107. In various other embodiments, intelligent computing device 101 can be a smart phone, a tablet computer, or any other portable electronic computing device capable of recording and transmitting digital images and communicating with server computer 120 and device 130 via network 110. In some embodiments of the present invention, intelligent computing device 101 may include additional components, for example, video analysis program 121 or ultrasonic devices.

Video camera 105*a* and 105*b* may be any suitable digital video device capable of capturing both dynamic and static digital images of the physical environment to be navigated by a visually impaired user. In some embodiments, a pair of digital cameras may used to provide digital images capable of being converted into three-dimensional representations of the physical environment to be navigated. In other embodiments, one digital video device may be used. In FIG. 1, video camera 105a and 105b are mounted on intelligent computing device 101. In other embodiments, video camera 105a and 105b, which will be referred to as video cameras 105 in future references, may be mounted or attached to a user's clothing or held and carried by a user. For example, video cameras 105 may be attached to the collar of the user's shirt, which may allow the user to move or turn their head in response to a sound without impacting analysis of the forward navigation environment. Video cameras 105 can capture dynamic image data (video) and static digital images.

In an embodiment, intelligent computing device 101 uses input from ultrasonic devices or sonar altered for use in air utilizing the concepts such as echolocation, for example, to provide information on the user's physical environment that may augment digital image information in low light or when no light is present. Ultrasonic waves or echolocation may provide information on the location and movement of objects in the user's environment that may be analyzed by a video analysis program, such as video analysis program 121 on server computer 120, or by any another program capable of analyzing reflected ultrasonic wave input to provide similar information on the user's physical environment, such as object location and motion, to a device associated with the user. In some embodiments, ultrasonic devices may be used in place of digital image capture devices such as video cameras 105.

Video capture program 106 operates to receive dynamic image data and static digital images from video cameras 105 and send the image data and images to a video analysis program, such as video analysis program 121 on server computer 120. In various embodiments, video capture program 106 can use image stabilization technology capable of making adjustments to digital video recording in response to a user's gait and movements. In the exemplary embodiment, video capture program 106 transmits the digital image data wirelessly to server computer 120

Range sensor 107 may be a laser rangefinder or similar device for determining a distance between a user and a location of the user's gaze focal point. The focal point of the user's gaze is indicated by the angle and direction of the range sensor 107 as indicated by the direction of intelligent computing device 101, for example, a pair of glasses worn by the user, on which the range sensor is mounted. A user's gaze focal point is the direction a user is looking while wearing intelligent computing device 101 and may be a user's navigation direction when the user is looking and moving in the same direction. In the exemplary embodiment, range sensor 107 wirelessly communicates range information to video analysis program 121 on server computer 120. In some embodiments, range sensor 107 may be continually activated. In other embodiments, range sensor 107 may be periodically activated by a prompt from the user; for example, a nod of the head or press on a button discreetly attached to the user's pocket or walking stick may activate the range sensor. In other embodiments, range sensor 107 may not be present, and the function of the range sensor to determine the distance to the user's gaze focal point may be incorporated into other components within data processing environment 100, such as video cameras 105 and video analysis program 121.

Server computer 120 includes video analysis program 121 and database 125. Server computer 120 may be a management server, a web server, or any other electronic device or computing system capable of receiving and sending data. In other embodiments, server computer 120 can be a laptop computer, a tablet computer, a netbook computer, a personal computer (PC), a desktop computer, a personal digital assistant (PDA), a smart phone, or any programmable electronic device capable of communicating with intelligent computing device 101 via network 110 and with various components and devices within data processing environment 100. In another embodiment, server computer 120 represents a computing system utilizing clustered computers and components to act as a single pool of seamless resources. Server computer 120 may include internal and external hardware components, as depicted and described with reference to FIG. 4.

Video analysis program 121 receives digital video data from video capture program 106 via network 110, extracts static images, and converts digital images to a three-dimensional image or format. As known to one experienced in the art, methods to convert video to static images and three-dimensional images exist in digital imaging technology. Video analysis program 121 can use the estimated distance data determined by analysis of the three-dimensional images or data provided by range sensor 107 to determine the spatial relationships between objects, boundaries, and the user. The determined spatial relationships may be used to create a map of the user's physical environment. Video analysis program 121 converts the spatial relationships determined from the three-dimensional representation of the digital images into output data using known techniques in digital imaging analysis. Video analysis program 121 sends the output data to a device, for example, device 130. The output data communicated to the device aids a user in navigating the physical environment. While in FIG. 1, video analysis program 121 is shown on server computer 120, one of skill in the art will appreciate that the video analysis program may be located anywhere within data processing environment 100 with access to intelligent computing device 101 and device 130 via network 110.

In an exemplary embodiment, database 125 on server computer 120 stores object recognition data, for example, digital images with an associated object name. In the exemplary embodiment, video analysis program 121 communicates wirelessly over network 110 with database 125. In various embodiments, database 125 can include a database management system to aid in determining the name of an object based on digital image data. Database 125 may be an object recognition database where an object recognition database may contain stored images of objects and the associated name of the object in the image. Video analysis program 121 may query database 125 to retrieve the name of an object that corresponds to a digital image data. For example, to query database 125 for the name of an object, a user may direct video cameras 105 to an area or object and request an object's name by pressing a button on his or her walking stick or attached to the user's clothing. If the object's digital image is identified by the object recognition process, video analysis program 121 may communicate an audio response to the user using a smart phone with audio capability or to intelligent computing device 101 providing a similar function. In another embodiment of the present invention, database 125 may be queried by a user for the name of an object through the use of a touch pad or touch screen by touching an area on the touch pad or touch screen corresponding to an object. The touch pad, for example, may be on the opposing side of the electrical stimulation pad's electrode matrix where the point touched may correspond to the object identified by electrical stimulation or a shock from an electrode in the electrode matrix. The touch pad may be responsive to touch through a layer of clothing.

In the exemplary embodiment, device 130 is shown as an electrical stimulation pad. Device 130 can be an output device associated with the user capable of receiving and communicating output data. Device 130 is capable of communicating information determined by video analysis program 121 on spatial relationships of objects in the physical environment to a user. In the exemplary embodiment, information on the physical environment is communicated to a user via the electrical stimulation pad through the use of a matrix of electrodes or transducers capable of supplying a mild electrical shock or electrical stimulation of varying intensity levels. Each electrode may provide a range of electrical stimulation similar to that used in physical therapy or a mild electric pulse or shock. The range of electrical stimulation levels may be individually calibrated by the user or with the aide of the electrical stimulation pad provider based on the user's sensitivity and comfort. The matrix of electrodes may be embedded in a plastic pad or carrier. The pad may be attached to the user by an elastic band or belts. In some embodiments, an adhesive or gel may be used to attach device 130 to the user. The matrix of electrodes with varying levels of intensity such as very mild, mild, medium, or strong shocks or electrical stimulation correspond to the spatial map created from the three-dimensional digital image of the environment, as discussed with reference to FIG. 3. In another embodiment, device 130 may be a touch screen, a touch pad, or a handheld pad that may provide a mild shock or electrical stimulation when touched thus providing information on the physical environment to the user.

The electrodes may vary the level of electrical stimulation based on the input received from video analysis program 121 via network 110. By providing a range of various levels of electrical stimulation corresponding to the analysis of the digital images captured by video cameras 105, device 130 can produce a "map" of the physical environment for the user. The level of stimulation an electrode emits may be based on an estimated distance of an object from the user. An example of a matrix of electrical stimulation produced in response to a physical environment digitally captured by video cameras 105 and analyzed by video analysis program 121 is discussed with reference to FIG. 3B. In some embodiments, variations in the level of stimulation may indicate motion. For example, a pulse of electrodes moving across an area of the electrode matrix on device 130 may indicate a moving object. Additionally, a specific level of electrical stimulation may indicate uneven terrain in the immediate vicinity of the user in some embodiments.

In various embodiments, device 130 may be an audio device, for example, an ear phone, an ear bud or speakers (not shown). Video analysis program 121 may generate an audio response to the user using an audio device such as a speaker, or an audio signal generating device to create beeps, an ear piece, or a cell phone capable of audio signals or speech. Video analysis program 121 may communicate information on gaze focal point distance to the user through audio transmission, for example, beeps may be used to communicate gaze focal point distance, which may be the navigation distance of the user to the focal point. For example, a user whose gaze is directed at a wall five meters away may hear a series of three short beeps while a user gazing at a tree ten meters away may hear two beeps. A user looking toward a fire hydrant one meter away, for example, may hear a series of five quick beeps. Additionally, information such as texture, surface, or motion may be communicated by specific tones or pitch. For example, a moving object may be identified by a high-pitched beep and water may be identified, for example, by low-pitched beeps.

In other embodiments, device 130 may use other methods to communicate a spatial map of the environment to the user such as using a transducer or an actuator that accepts electrical energy and produces movement or pressure from an element embedded in an output pad on the user or vibrations generated similar to an ultrasonic transducer.

Figure 2:
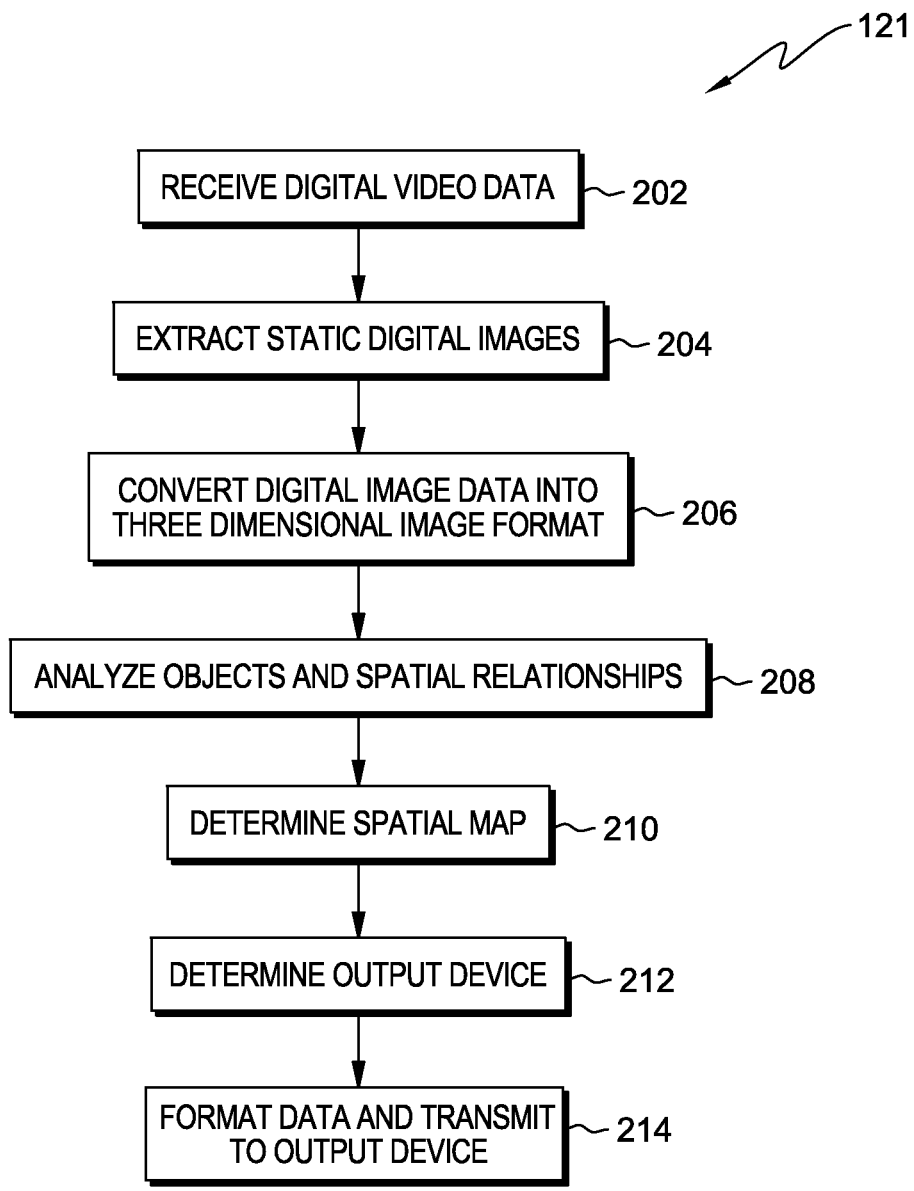

FIG. 2 is a flowchart depicting operational steps of video analysis program 121 for analyzing digital video image data to assist a visually impaired user in navigation of a physical environment, in accordance with an exemplary embodiment of the present invention.

In step 202, video analysis program 121 receives digital video data from video capture program 106 of the images captured by video cameras 105 mounted on intelligent computing device 101. Video cameras 105 capture real-time digital video of a user's physical environment as directed by the user's gaze. Video capture program 106 may use image stabilization technology capable of making adjustments to digital video recording in response to the user's gait.

In step 204, video analysis program 121 extracts static digital images from the digital video data for analysis. The capability to extract static images from digital video data is well known and can be provided by most digital video devices. Static digital images may be extracted, for example, once every one second, for analysis by video analysis program 121. The rate of static image extraction or image refresh rate is not limited to one image per second. Faster refresh rates may provide a "real-time" view of the environment of the user. In some embodiments, the user may set the rate of static image extraction depending on personal preferences and data processing capabilities. For example, the static image refresh rate may be set on a small dial on intelligent computing device 101 or on the user's cell phone configured to work with video analysis program 121.

In step 206, video analysis program 121 converts the digital image data from the static digital images extracted from the video data into a three-dimensional format. In the exemplary embodiment, digital video data from video cameras 105 is used. Other embodiments may use two digital cameras mounted on intelligent computing device 101 to utilize stereographic techniques of two-dimensional static image conversions to three-dimensional images.

In step 208, video analysis program 121 analyzes objects and spatial relationships between the objects captured in the digital video data and rendered into three-dimensional form to determine the physical environment "observed" by the user. Using known techniques for determining spatial relationships in digital image analysis, video analysis program 121 determines the approximate size, location, movement, and estimated distance of objects captured by video cameras 105. Video analysis program 121 may utilize various perspectives within the three-dimensional digital image data to determine the estimated distance to objects in the user's video camera field of view. Video analysis program 121 may utilize gaze focal point distance data provided by range sensor 107 to determine the distance of the object or the area that is the focal point of the user's gaze. Range sensor 107 can send gaze focal point distance information at the same range data refresh rate as the digital video image refresh rate discussed above with respect to video analysis program 121. Video analysis program 121 may compare current digital image data to the previous digital image data captured immediately before (e.g. the previous second's digital image data) to determine the motion of objects.

In step 210, video analysis program 121 determines a spatial map of the physical environment using the analysis of the three-dimensional images of objects and spatial relationships. The spatial map of the environment is a two-dimensional representation of the objects and their relationships, i.e., how close they are to the user.

In step 212, video analysis program 121 determines the device used for the output data. In the exemplary embodiment, device 130 is an electrical stimulation pad. In various other embodiments, the user may indicate a preferred device for output data by turning a small dial or toggle switch on intelligent computing device 101, for example, to indicate an electrical stimulation pad, an audio device, or another device. In some embodiments, an indicator may be configured into a cell phone for the user to select their preferred device. In other embodiments, video analysis program 121 may determine the type of device by the type of data the output device accepts, for example, if the video analysis program sends data formatted for an electrical stimulation pad, and it is returned with an error code, then the video analysis program can send audio output data to the audio device. The user may utilize multiple types of devices for output data. For example, while using an electrical stimulation pad, the user may request the distance of an object in the gaze focal point by a button, a nod or some other gesture, or request object recognition either of which responses may be provided by an audio signal or speech response.

In step 214, if video analysis program 121 determines device 130 is an electrical stimulation pad, the video analysis program formats the output data of the digital image for an electrical stimulation pad and sends, or transmits, the spatial map or output data to device 130 via network 110. The output data for the spatial map is formatted and converted into a "map" of electrical stimulations or mild electrical shocks ranging in intensity depending on the proximity of objects to the user. The matrix of electrical stimulation electrodes in the electrical stimulation pad may be used to create a map of the user's environment. An example of how an electrical stimulation pad may create a map of a digital image captured and analyzed is discussed with reference to FIG. 3B.

If video analysis program 121 determines device 130 is some other device, for example, an audio device, the video analysis program determines audio output and sends, or transmits, the audio output data to the audio device, such as ear phones or speakers, via wireless network 110. In some embodiments, a wire may be used to connect ear phones or ear buds to intelligent computing device 101.

In various embodiments of the present invention, video analysis program 121 may determine a gaze focal point distance as part of the output data. Using determined spatial information, video analysis program 121 may extract an estimated distance for the user's gaze focal point as identified by the direction of the video cameras 105 on intelligent computing device 101 on the user. In another embodiment of the present invention, video analysis program 121 may use data from range sensor 107 to determine the distance to the gaze focal point. Based on the analysis of the digital video image data, video analysis program 121 determines the appropriate audio output for the gaze location. For example, for an audio output, a series of beeps identifies to the user the distance to the gaze focal point or by a tone or pitch of the beep. The pitch of the beep may also be used to identify the nature of the element or object in the gaze focal point. For example, a medium-pitched tone may identify a hard surface such as pavement or concrete.

Figure 3A:
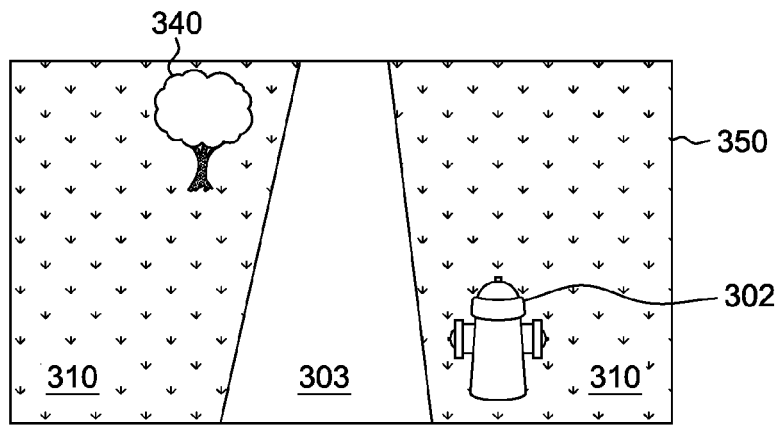

FIG. 3A depicts an exemplary image captured by a video camera for use with video analysis program 121, in accordance with an embodiment of the present invention. Image 350 is a representation of a static, digital image of a physical environment captured by video cameras 105. Image 350 includes sidewalk 303, fire hydrant 302, grass 310, and tree 340.

Figure 3B:
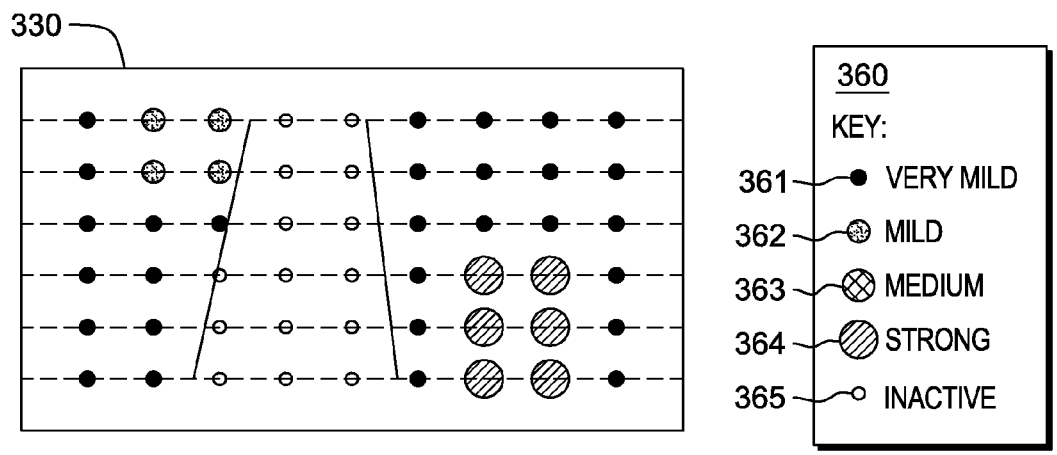

FIG. 3B illustrates an example of an electrical stimulation pattern generated in connection with the operation of video analysis program 121, as may be experienced by a user in response to the digital image represented by image 350, in accordance with an embodiment of the present invention. Reference table 360 identifies the electrodes of the electrode matrix by the level of stimulation the user may experience. The level of stimulation of electrodes in the electrode matrix may be identified as level 361, level 362, level 363, level 364, or level 365 depending on the level of stimulation the user experiences. The level of stimulation experienced is determined by video analysis program 121 in response to the analysis of the digital image data of the environment captured by video cameras 105 (represented in FIG. 3A). Video analysis program 121 determines a spatial map of the physical environment illustrated in FIG. 3A and converts the spatial map into image output data that can be sent to electronic stimulation pad 330. In response to the image output data, electrical stimulation pad 330 generates an electrical stimulation pattern to electrical stimulation pad 330 worn by the user. The electrical stimulation pattern creates a "map" of the digital image captured (FIG. 3A) in which objects close to the user, for example, fire hydrant 302 in FIG. 3A may generate a strong electrical stimulation at level 364, as shown in FIG. 3B. An object far away, for example, tree 340 in FIG. 3A, may generate a very mild electric stimulation at level 361. A flat, smooth surface such as sidewalk 303 in FIG. 3A may not generate any electrical stimulation or be an inactive electrode as shown by electrodes at level 365 in FIG. 3B. The matrix of electrical stimulation, which varies according to the analysis of the environment determined by video analysis program 121, may provide the user who may be visually impaired with a "map" to better understand or "see" the environment to navigate or walk to their desired destination.

Figure 3C:
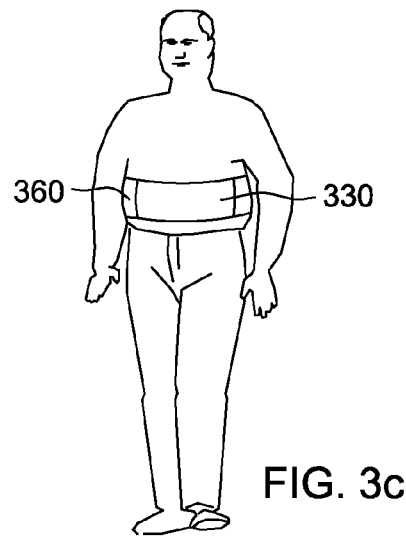

FIG. 3C depicts a user wearing electrical stimulation pad 330, in accordance with an embodiment of the present invention, to receive information from an electrical stimulation matrix providing a map of the physical environment. Elastic band 360 may be used to hold electric stimulation pad 330 in place on the user. This example is for illustration purposes only. A user may decide to attach electrical stimulation pad 330 in other locations on his or her body such as an arm, back, or leg as desired.

Figure 4:
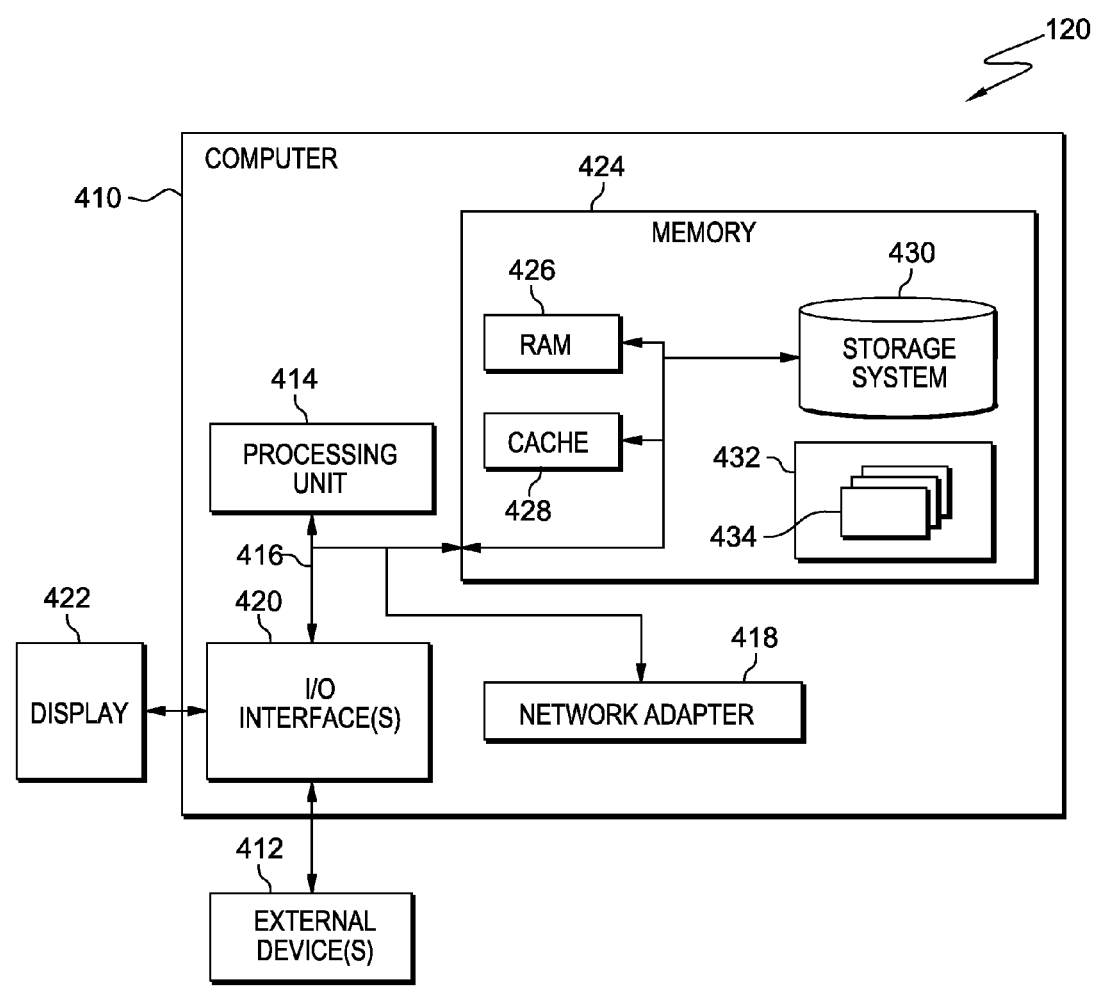

FIG. 4 is a block diagram depicting components of a computer system 410, such as server computer 120, in accordance with an embodiment of the present invention. The components of computer system 410, may include, but are not limited to, one or more processors or processing unit 414, a system memory 424, and a bus 416 that couples various system components including system memory 424 to processing unit 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

System memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, system memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein, for example, video analysis program 121. Computer system 410 may also communicate with one or more external device(s) 412 such as a keyboard, a cell phone, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interfaces 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for communicating navigation information on a physical environment to a user, the method comprising:
    receiving, by a server computer, at least one digital image of a physical environment of the user captured by one or more digital video devices;
    converting, by the server computer, the at least one digital image into a three-dimensional image;
    analyzing, by the server computer, the three-dimensional image using object analysis to generate output data, wherein the output data corresponds to the physical environment;
    determining, by the server computer, at least one device associated with the user;
    formatting, by the server computer, the output data for use with the at least one device, wherein the least one device is capable of providing to a user both a spatial map of the physical environment created by an electrical stimulation pad and receiving from a user a tactile user input corresponding to an object represented in the spatial map of the physical environment to request an identification of an object; and
    receiving, by the server computer, user inputs requesting an estimated distance to the object using gaze focal point, to create a tactile representation of the physical environment using a matrix of electrical stimulation electrodes providing various levels of intensity of electrical stimulation to represent a terrain, a distance to an object, and motion of an object in the physical environment, to provide the identification of the object based, at least in part, on the received user input on the surface of the electrical stimulation pad, and to provide a series of beeps representing a distance to the object, a type of object, and a motion of the object in the physical environment.

2. The method of claim 1, wherein formatting the output data for use with the at least one device, further comprises:
    receiving, by the server computer, from the at least one device, information for a touch on an area of the electrical stimulation pad corresponding to the object in the spatial map of the physical environment to receive the request for the identification of the object; and
    retrieving, by the server computer, a name of the object in the physical environment from a database, the database containing the at least one digital image associated with the name of the object.

3. The method of claim 1, wherein analyzing, by the server computer, the three-dimensional image using object analysis to generate output data, wherein the output data corresponds to the physical environment, further comprises:
    determining, by the server computer, a distance to an object, based, at least in part, on a focal point of the user's gaze; and
    determining, by the server computer, output data as a series of beeps that correspond to the distance to the object, based, at least in part, on the distance to the object wherein a tone of the beeps provides information on a type of object and information on a motion of the object.

4. The method of claim 1, wherein formatting, by the server computer, the output data for use with the device further comprises:
transmitting, by a computer device, the output data to the at least one device associated with the user;
wherein the output data is formatted to create the spatial map on the electrical stimulation pad that depicts the physical environment, the output data is formatted to create verbal responses from one of a smartphone and an intelligent computing device, and the output data is formatted for a series of beeps representing information on an object in the physical environment from one of a smartphone and an intelligent computing device.

5. The method of claim 1, wherein the at least one device associated with the user includes at least one of: an electrical stimulation pad with a matrix of embedded electrical stimulation electrodes that provide varying levels of an electrical stimulation representing the spatial map of the physical environment, an audio device including one of a smart phone and an intelligent computing device, and an electrical stimulation pad that includes a touch pad accessible to the user to request information on an object corresponding to the matrix of embedded electrodes.

6. The method of claim 1, wherein formatting, by the server computer, the output data for use with the device further comprises:
determining, by a computer device, a level of intensity of the electrical stimulation associated with the physical environment, the level corresponding to a motion of an object and a terrain in the physical environment.

7. The method of claim 1, further comprising:
receiving, by the server computer, simultaneously, a tactile user input corresponding to the object in the spatial map of the physical environment provided on the at least one device using a matrix of electrical stimulation electrodes with a user accessible touch pad and a user input provided on one of an intelligent computing device and a smartphone using a user's gaze focal point.

8. A computer program product for communicating navigation information on a physical environment to a user, the computer program product comprising:
one or more non-transitory computer readable storage devices and program instructions stored on the one or more non-transitory computer readable storage devices when executed by a server computer perform a method comprising:
receiving at least one digital image of a physical environment of the user captured by one or more digital video devices;
converting the at least one digital image into a three-dimensional image;
analyzing the three-dimensional image using object analysis to generate output data, wherein the output data corresponds to the physical environment;
determine determining at least one device associated with the user;
formatting the output data for use with the at least one device, wherein the least one device is capable of providing to a user both a spatial map of the physical environment created by an electrical stimulation pad, and receiving from a user a tactile user input corresponding to an object represented in the spatial map of the physical environment to request an identification of an object; and
receiving user inputs requesting an estimated distance to the object using gaze focal point, to create a tactile representation of the physical environment using a matrix of electrical stimulation electrodes providing various levels of intensity of electrical stimulation to represent a terrain, a distance to an object, and motion of an object in the physical environment, to provide the identification of the object based, at least in part, on the received user input on the surface of the electrical stimulation pad, and to provide a series of beeps representing a distance to the object, a type of object, and a motion of the object in the physical environment.

9. The computer program product of claim 8, wherein receiving from a user a tactile user input corresponding to an object represented in the spatial map, further comprises:
receiving a touch on an area of the electrical stimulation pad corresponding to the object in the spatial map of the physical environment to receive the request for the identification of the object; and
retrieving a name of the object in the physical environment from a database, the database containing the at least one digital image associated with the name of the object.

10. The computer program product of claim 8, wherein analyzing the three-dimensional image using object analysis to generate output data, wherein the output data corresponds to the physical environment, further comprises:
determining a distance to an object, based, at least in part, on a focal point of the user's gaze; and
determining output data as a series of beeps that correspond to the distance to the object, based, at least in part, on the distance to the object wherein a tone of the beeps provides information on a type of object and information on a motion of the object.

11. The computer program product of claim 8, wherein formatting the output data for use with the device further comprises:
transmitting the output data to the at least one device associated with the user;
wherein the output data is formatted to create the spatial map on the electrical stimulation device that depicts the physical environment, the output data is formatted to create verbal responses from one of a smartphone and an intelligent computing device, and the output data is formatted for a series of beeps representing information on an object in the physical environment from one of a smartphone and an intelligent computing device.

12. The computer program product of claim 8, wherein the at least one device associated with the user includes at least one of: an electrical stimulation pad with a matrix of embedded electrical stimulation electrodes that provide varying levels of an electrical stimulation representing the spatial map of the physical environment, an audio device including one of a smart phone and an intelligent computing device, and an electrical stimulation pad that includes a touch pad accessible to the user to request information on an object corresponding to the matrix of embedded electrodes.

13. The computer program product of claim 8, wherein formatting the output data for use with the device further comprises:
determining a level of intensity of the electrical stimulation associated with the physical environment, the level corresponding to a motion of an object and a terrain in the physical environment.

14. A computer system for communicating navigation information on a physical environment to a user, the system comprising:
- a server computer;
- one or more computer non-transitory readable storage media;
- program instructions stored on at least one of the one or more non-transitory computer readable storage media when executed by the server computer perform a method comprising:
- receiving at least one digital image of a physical environment of the user captured by one or more digital video devices;
- converting the at least one digital image into a three-dimensional image;
- analyzing the three-dimensional image using object analysis to generate output data, wherein the output data corresponds to the physical environment;
- determining at least one device associated with the user;
- formatting the output data for use with the at least one device, wherein the least one device is capable of providing to a user both a spatial map of the physical environment created by an electrical stimulation pad, and receiving from a user a tactile user input corresponding to an object represented in the spatial map of the physical environment to request an identification of an object; and
- receiving user inputs requesting an estimated distance to the object using gaze focal point, to create a tactile representation of the physical environment using a matrix of electrical stimulation electrodes providing various levels of intensity of electrical stimulation to represent a terrain, a distance to an object, and motion of an object in the physical environment, to provide the identification of the object based, at least in part, on the received user input on the surface of the electrical stimulation pad, and to provide a series of beeps representing a distance to the object, a type of object, and a motion of the object in the physical environment.

15. The computer system of claim 14, wherein receiving from a user a tactile user input corresponding to an object represented in the spatial map, further comprises:
- receiving a request to identify a touch on an area of the electrical stimulation pad corresponding to the object in the spatial map of the physical environment to receive the request for the identification of the object; and
- retrieving a name of the object in the physical environment from a database, the database containing the at least one digital image associated with the name of the object.

16. The computer system of claim 14, wherein analyzing the three-dimensional image using object analysis to generate output data, wherein the output data corresponds to the physical environment, further comprises:
- determining a distance to an object, based, at least in part, on a focal point of the user's gaze; and
- determining output data as a series of beeps that correspond to the distance to the object, based, at least in part, on the distance to the object wherein a tone of the beeps provides information on a type of object and information on a motion of the object.

17. The computer system of claim 14, wherein formatting the output data for use with the device further comprises:
- transmitting the output data to the at least one device associated with the user;
- wherein the output data is formatted to create a spatial map on the electrical stimulation device that depicts the physical environment, the output data is formatted to create verbal responses from one of a smartphone and an intelligent computing device, and the output data is formatted for a series of beeps representing information on an object in the physical environment from one of a smartphone and an intelligent computing device.

18. The computer system of claim 14, wherein the at least one device associated with the user includes at least one of: an electrical stimulation pad with a matrix of embedded electrical stimulation electrodes that provide varying levels of an electrical stimulation representing the spatial map of the physical environment, an audio device including one of a smart phone and an intelligent computing device, and an electrical stimulation pad that includes a touch pad accessible to the user to request information on an object corresponding to the matrix of embedded electrodes.

19. The computer system of claim 14, wherein formatting the output data for use with the device further comprises:
- determining a level of intensity of the electrical stimulation associated with the physical environment, the level corresponding to a motion of an object and a terrain in the physical environment.

* * * * *